United States Patent
Park

(10) Patent No.: US 7,328,514 B2
(45) Date of Patent: Feb. 12, 2008

(54) POWER TOOL BEARING ARRANGEMENT

(75) Inventor: Keith Park, Ellerton (GB)

(73) Assignee: GMCA Pty Limited (AU)

(*) Notice: Subject to any disclaimer, the term of this patent is extended or adjusted under 35 U.S.C. 154(b) by 146 days.

(21) Appl. No.: 11/080,957

(22) Filed: Mar. 15, 2005

(65) Prior Publication Data

US 2005/0210687 A1 Sep. 29, 2005

(30) Foreign Application Priority Data

Mar. 15, 2004 (GB) ................. 0405729.5

(51) Int. Cl.
  *B23D 49/00* (2006.01)
  *B23D 51/00* (2006.01)
  *B27B 3/12* (2006.01)
  *B27B 19/00* (2006.01)
  *B27B 19/04* (2006.01)
  *B23D 49/04* (2006.01)

(52) U.S. Cl. ................. 30/393; 30/392; 30/394; 83/699.21

(58) Field of Classification Search ........... 30/393, 30/392, 394, 374; 83/699.21; 279/76, 77
See application file for complete search history.

(56) References Cited

U.S. PATENT DOCUMENTS

| | | | | | |
|---|---|---|---|---|---|
| 3,890,708 | A | * | 6/1975 | Bauer | .......... 30/393 |
| 4,308,852 | A | * | 1/1982 | Gebhart | .......... 125/16.01 |
| 5,205,043 | A | * | 4/1993 | Batt et al. | .......... 30/393 |
| 5,634,277 | A | * | 6/1997 | Wada et al. | .......... 30/392 |
| 5,819,421 | A | * | 10/1998 | Giacometti et al. | .......... 30/392 |
| 5,987,758 | A | * | 11/1999 | McCurry et al. | .......... 30/392 |
| 6,769,188 | B2 | * | 8/2004 | Dorner et al. | .......... 30/392 |
| 7,111,405 | B2 | * | 9/2006 | Delfini et al. | .......... 30/392 |
| 2003/0070307 | A1 | * | 4/2003 | Walker | .......... 30/374 |

FOREIGN PATENT DOCUMENTS

| | | |
|---|---|---|
| DE | 32 03 733 A1 | 8/1983 |
| DE | 87 02 727 U1 | 4/1987 |
| DE | 88 08 036 U1 | 9/1988 |
| DE | 92 14 674 U1 | 12/1992 |
| EP | 1 188 505 A | 3/2002 |

* cited by examiner

*Primary Examiner*—Joseph J. Hail, III
*Assistant Examiner*—Alvin J Grant
(74) *Attorney, Agent, or Firm*—McKee, Voorhees & Sease, P.L.C.

(57) ABSTRACT

The invention relates to a power tool with a reciprocating blade, such as a jigsaw, in which the blade can have linear and pendulum movement components imparted thereon and also to a blade holder assembly. There is provided a bearing for a holder member which allows control of the movement of the holder in relation to both movement components, said bearing including a first part though which the holder member passes and a second part in relation to which the holder member and the first part are movable.

12 Claims, 3 Drawing Sheets

POWER TOOL BEARING ARRANGEMENT

BACKGROUND OF THE INVENTION

A. Field of the Invention

The invention to which this application relates is to a bearing arrangement of the type which can be used particularly, although not necessarily exclusively, in power tools with a reciprocating blade such as jigsaws or scrollers in which the blade to reciprocate in a linear or pendular/orbital manner. The same are hereinafter referred to as jigsaws in a non-limiting manner.

B. Problems in the Art

The use of jigsaws is well known and they typically comprise the provision of a power source, such as an electric motor which acts to drive an elongate member, reciprocally, in a linear direction and/or in some cases, as in this invention, with a pendulum or swinging movement. Typically selection means are provided to allow the specific type of movement to be selected by the user.

Typically, the elongate member acts as a holder for a cutting blade which protrudes out from the housing of the power tool and the elongate member and motor are mounted within the housing. Typically, the linear movement is along a first linear axis. At a first end of the elongate member, the blade is mounted and, at the second, opposing end, a pivotal location is provided about which the elongate member moves when the pendulum movement is selected.

In order to ensure that the movement of the elongate member is controlled in the desired manner, first and second spaced bearings are typically provided. The first bearing is typically provided at or proximate to the said pivotal location, and in one embodiment, may include the pivot location. The second bearing is provided at a position along the elongate member spaced from the pivotal location and towards the location at which the blade is gripped to perform the cutting action.

The second bearing includes an aperture which is slotted with a first axis of the slot longer than a second axis of the slot which is perpendicular to the first axis. The shorter axis length is typically the same or close to the diameter of the member which passes through the aperture. This arrangement allows the member to swing along the first axis of the slot but movement of the member in the second axis, lateral to the swinging movement of the member, is substantially prevented.

However, a problem with this arrangement is that the longer axis of the slot allows the elongate member to be free to move in a relatively uncontrolled manner along a relatively long path which, although required when the same is moved in the pendulum manner, can mean that there is a lack of control of movement of the member in the linear reciprocating direction.

SUMMARY OF THE INVENTION

The aim of the present invention is to provide a power tool with a blade holding member and drive for a reciprocating blade of a tool such as a jigsaw or scroller, which member can be controlled to have a reciprocating linear movement provided thereon and also a swinging movement thereon to provide a reciprocating pendulum movement on the holder member and to allow the movement of the member with improved control as it moves in the pendulum manner.

In a first aspect of the invention, there is provided a power tool said power tool including a blade to perform a cutting action, a holder member for said blade to allow movement to be imparted onto the blade when the power tool is operational, said holder member located with at least a first bearing in the power tool, said holder member capable of pendulum movement, said pendulum movement imparted on the holder member at a pivotal location at or adjacent to one end of the holder member and wherein the said bearing has a first part with a substantially circular aperture through which the holder member passes, and a second part which receives the first part and allows sliding movement between said first and second parts.

Typically at least one further bearing is provided, said further bearing provided at the pivotal location or closer to the pivotal location than the first bearing.

Typically, the holder member is provided to pass through the aperture in the first part and move in a linear reciprocating manner along said aperture.

Typically, the movement between the first and second parts of the first bearing is movement of the first part along an axis substantially perpendicular to the longitudinal axis of the holder member.

In one embodiment, the first and/or second parts are provided with location means which allow the guided movement of the first part with respect to the second part.

In one embodiment the location means for the first part in the second part are shaped or provided with sufficient tolerance so as to allow the sliding movement of the first part to include an arcuate component, to allow the swinging or pendulum movement of the first part caused by the holder member to be accommodated as the first part moves along the second part.

In one embodiment, the second part includes an aperture formed therein, the length of which defines the extent of movement of the first part with respect to the second part, with the ends of the, typically elongate, aperture defining end stops for the movement of the first part.

In one embodiment, the first part is substantially square or rectangular in plan.

Typically, the other of the bearings is provided with a ball joint arrangement and acts as the pivotal location so that the pendulum swinging movement is imparted onto the holder member.

In a further aspect of the invention there is provided a jigsaw said tool having a power supply which, when activated, provides power to a motor which imparts drive to a blade holder and in turn, causes movement of a blade connected to the blade holder to perform a cutting operation on a workpiece, said blade holder including a holder member within the housing of the tool, said holder member mounted with respect to at least two, spaced bearings, a first bearing mounted with respect to the holder member towards one end thereof at or adjacent to a pivotal location for imparting a swinging or pendulum movement on the holder member and a second bearing, spaced from the first bearing, which allows movement in a controlled manner of the holder member in a linear reciprocating direction substantially in line with the longitudinal axis of the holder member and in a pendulum manner and wherein movement of the holder member in the linear direction with respect to the said second bearing is through an aperture provided in a first part of the bearing and movement in the pendulum manner is by movement of the holder member in conjunction with the first part, with respect to a second part of the bearing.

Typically, the dimension of the aperture in the first part of the second bearing is of the same shape and only slightly larger than the shape and size of the cross sectional area of the holder member such that the aperture retains the holder member so that only linear movement of the member is possible through the aperture. Typically the second part of the bearing has a slot or aperture formed therein, one axis of which is similar in length to the width of the first part of the bearing and a perpendicular axis of which is of a length which is greater than the length of the first part of the bearing so as to allow relative movement of the first part along the said slot or aperture.

In a yet further aspect of the invention there is provided a blade holder assembly, said assembly including a blade, a blade clamp, an elongate holder member connected to the blade clamp, a drive means for imparting movement on the holder member and at least one bearing characterised in that the bearing includes a first part with an aperture through which the holder member passes and moves in a linear reciprocating manner and a second part in which the first part is received, and said first part and holder member movable as a unit along an aperture defined in the second part.

In one embodiment the movement between the first part and the second part includes an arcuate component. In one embodiment the movement of the first part along the second part is in a guided sliding manner along a slotted aperture.

BRIEF DESCRIPTION OF THE DRAWINGS

Specific embodiments of the invention will now be described, wherein.

DETAILED DESCRIPTION OF THE INVENTION

Figure 1:
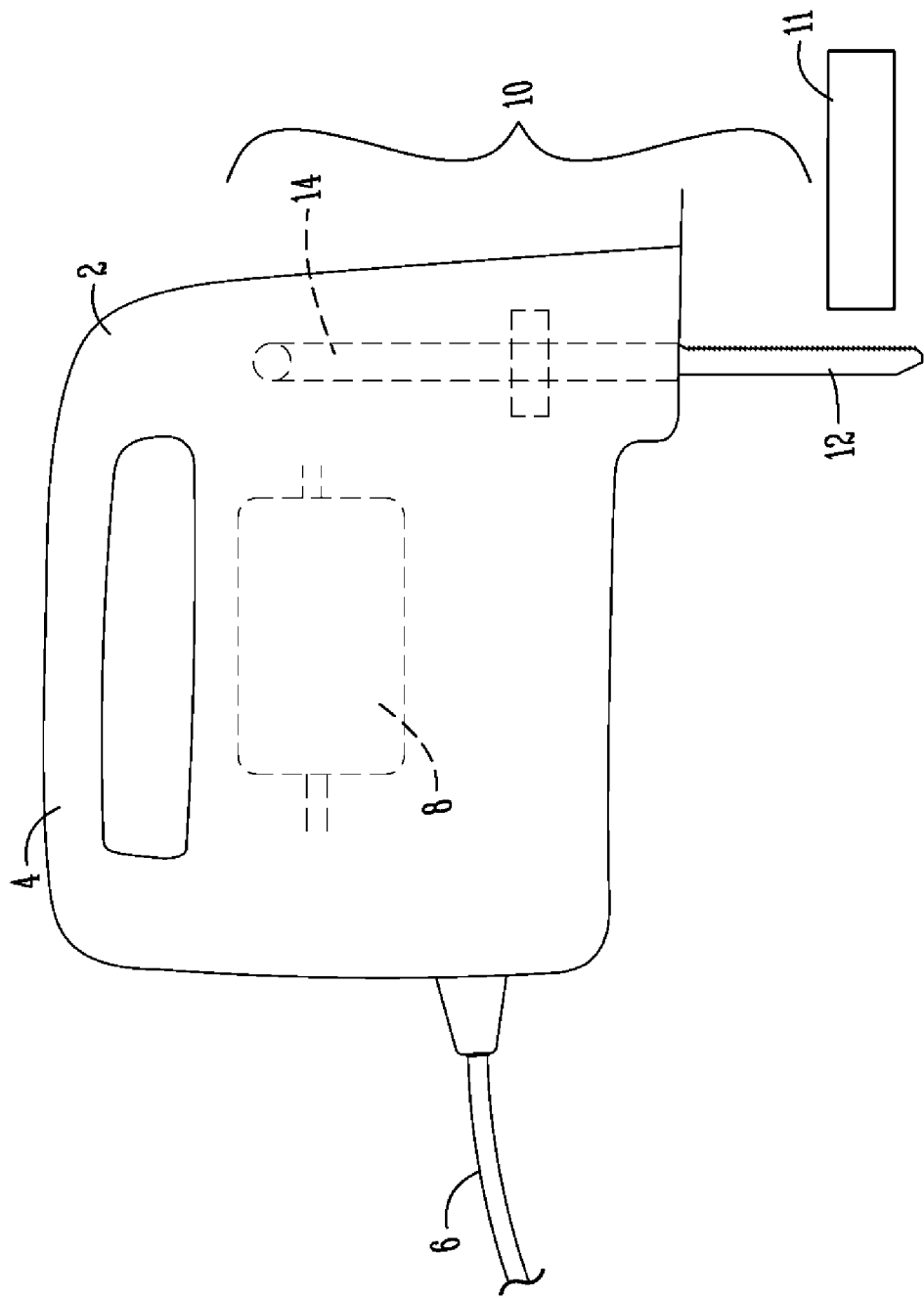
FIG. 1 illustrates a view of a power tool in the form of a jigsaw with which the invention can be utilised.

Referring firstly to FIG. 1, there is illustrated a view of a power tool in the form of a jigsaw. The jigsaw includes a plastic housing 2 which defines a handle 4 by which the tool can be gripped and an internal cavity in which the majority of the components for the tool are housed, some of which are illustrated in broken lines. The tool is typically electrically powered via cable connection 6 to a motor 8. The motor 8 is connected to drive a blade holder assembly 10 which includes a blade 12 protruding from the housing and which is held by a blade holder member 14 which is elongate and onto which drive movement is imparted from the motor 8 to allow the blade holder to drive the blade in a reciprocating manner to perform the cutting and/or scrolling action on a workpiece 11. The movement which is imparted can be a linear reciprocating movement along the longitudinal axis of the blade holder member and can also include a pendulum movement in an orbital or swinging manner, with both types of movement being well known and therefore not explained in detail here.

Figure 2:
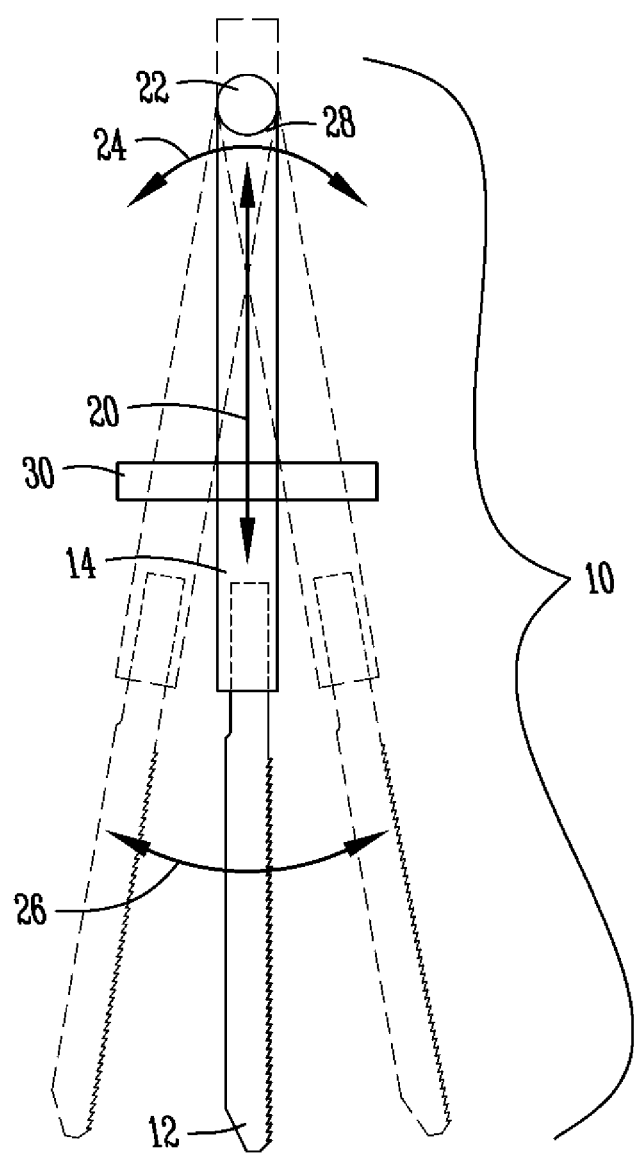
FIG. 2 illustrates the two types of movement, in a schematic manner which can be imparted on the blade of the power tool of FIG. 1.

Referring now to FIG. 2 the blade holder assembly is shown in more detail and when a pendulum action for the blade has been selected. The holder assembly comprises the holder member 14 in accordance with the invention provided to be movable as indicated by arrow 20 in a reciprocating manner and pivotally movable about pivot location 22 simultaneously in a swinging or pendulum manner as indicated by arrows 24, 26. The blade can be attached to the holder member in a number of commercially available ways and therefore this is not described in detail here.

The extent of movement of the blade in the linear and swinging directions is indicated in an exaggerated manner by the broken lines. The assembly is also provided with two bearing locations, a bearing 28 at a pivotal location at which the swinging movement is imparted, and a bearing 30, spaced from the bearing 28 towards the blade location and which accommodates and controls the linear and swinging movement of the holder member 14. It is the bearing 30 to which the invention specifically relates.

Figure 3A:
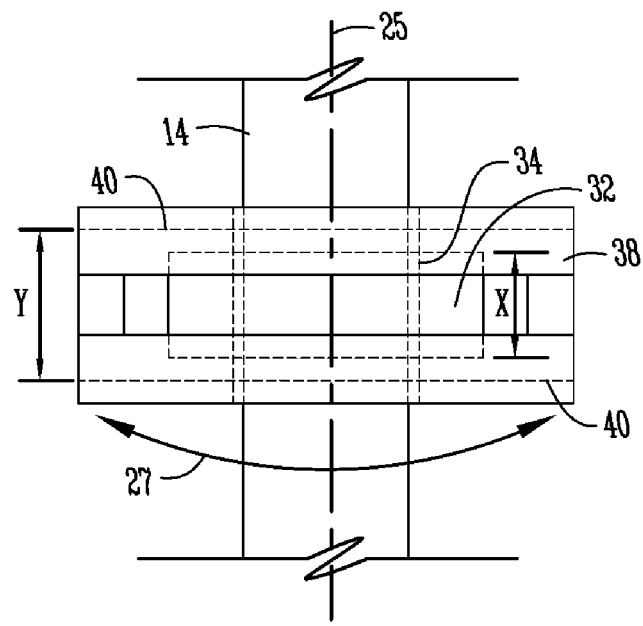
FIGS. 3a and 3b illustrate in plan and elevation a bearing and holder member arrangement in accordance with one embodiment of the invention.
Figure 3B:
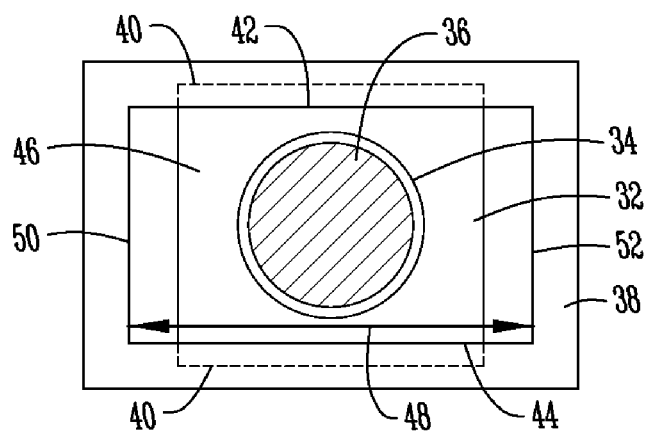

The bearing 30 is shown in more detail in FIG. 3a which shows an elevation of the bearing 30 and FIG. 3b which shows a plan view of the bearing 30 with a section through the holder member 14. The bearing 30 comprises a first part 32 which includes a circular aperture 34 which is of a size only slightly larger than the circular cross section 36 of the holder member 14 which passes through the aperture 34. The holder member 14 is free to move in the reciprocal linear manner through the aperture 34 in direction of arrow 20. The aperture 34 acts to restrict movement of the holder member in any other direction. The first part 32 is received within a second part 38 which is typically in a fixed position with respect to the housing. Location means 40 on the opposing side walls of the part 38 receive opposing sides 42, 44 of the first part 32 therein. The location means 40 also form the elongate side walls of slot 46 formed in the second part.

The first part 32 is free to slide along the slot 46 as indicated by arrow 48 with the holding member 14 located therein. The extent of movement possible along the length of the slot 46 is defined by the end walls 50, 52 of the slot 46. The movement of the first part with respect to the second part allows the swinging movement of the holder member 14 to be accommodated and controlled as typically the location means 40 and sides 42,44 of the first part are dimensioned such that no or limited movement between the first and second parts is possible in a direction other than in the direction of the arrow 48.

The fit between the location means 40 and the first part is typically provided such that the arcuate component of movement of the first part with respect to the second part, due to the action of the swinging or pendulum movement on the holder member is accommodated and this is typically achieved by the provision of a gap Y being provided in the location means 40 in the direction of the longitudinal axis 25 of the holder member 14 which is greater than the depth X of the first part 32 so as to allow the swinging movement of the first part 32 and the holder member 14 as indicated by arrow 27 to be accommodated.

Thus, in accordance with the invention there is provided a bearing assembly which allows improved control of the movement of the holder member in both linear and pendulum movements. This is due to the fact that the first part of the bearing 30 allows only the linear movement component of the holder member and the second part of said bearing allows only movement of the first part along the second part as a result of the pendulum movement exerted on the holder member.

It is found that the provision of this bearing arrangement in conjunction with the further bearing allows the provision of the blade holder member to be movable in a more controlled manner when a pendulum or orbital movement is selected by the user. If, as is possible on certain tools, a selection is possible between linear only movement and pendulum movement, then if linear movement only is selected, the holder member moves through the first part with no movement required between the first and second parts of the bearing. When pendulum movement is selected, the movement between the first and second parts of the bearing occurs in addition to the movement of the holder with respect to the first part of the bearing.

The invention claimed is:

1. A reciprocating power tool,
    said tool connectable to a power supply which, when activated, provides power to a motor which imparts drive to a blade holder assembly and in turn, causes movement of a blade connected to the blade holder assembly to perform a cutting operation on a workpiece;
    said blade holder assembly including a holder member within the housing of the tool;
    said holder member mounted with respect to at least two, spaced bearings, a first bearing mounted with respect to the holder member towards one end thereof at or adjacent to a pivotal location for imparting a swinging or pendulum movement on the holder member and a second bearing, spaced from the first bearing, which allows movement in a controlled manner of the holder member in a linear reciprocating direction substantially in line with the longitudinal axis of the holder member and in a pendulum manner;
    movement of the holder member in the linear direction with respect to the said second bearing is through an aperture provided in the first part of the said second bearing and movement in the pendulum manner is by movement of the holder member in conjunction with the first part, with respect to a second part of the second bearing;
    characterised in that the second part of the second bearing has a slot or aperture formed therein, with a width along a first axis which is substantially similar to a width of the first part of said second bearing along said first axis and a length along a second axis, perpendicular to the first axis that is greater than a length of the first part of said second bearing along said second axis so as to allow relative movement of the first part along the said slot or aperture along said second axis, said first or second parts of the second bearing provided with location means to allow guided movement of the first part with respect to the second part and sufficient tolerance is provided in the location means to allow the sliding movement of the first part along the second part to include an arcuate component.

2. A tool according to claim 1 characterised in that the holder member is provided to pass through the aperture in the first part the second bearing and move in a linear reciprocating manner along said aperture.

3. A tool according to claim 1 characterised in that the movement between the first and second parts of the bearing is movement of the first part along an axis substantially perpendicular to the longitudinal axis of the holder member.

4. A tool according to claim 1 characterised in that the arcuate component is that of the pendulum movement imparted on the holder member.

5. A tool according to claim 1 characterised in that the second part of the bearing includes an aperture formed therein the length of an axis of which defines the extent of movement of the first part with respect to the second part.

6. A tool according to claim 5 characterised in that the aperture is elongate and the opposing ends of the aperture along the longest axis of the aperture define end stops for the movement of the first part.

7. A tool according to claim 1 characterised in that the first part is substantially square or rectangular in plan.

8. A tool according to claim 1 characterised in that the dimension of the aperture in the first part of the second bearing is of the same shape and only slightly larger than the shape and size of the cross sectional area of the holder member such that the aperture retains the holder member so that only linear movement of the member is possible along the aperture.

9. A tool according to claim 1, characterized in that the blade holder assembly includes a blade, a blade clamp, an elongate holder member connected to the blade clamp, and a drive means for imparting movement on the holder member.

10. A tool according to claim 9 characterised in that the movement between the first part and the second part includes an arcuate component.

11. A tool according to claim 1 characterised in that the substantial similarity between the first axis of the slot or aperture and the width of the first part maximizes the movement of the first part along said first axis such that only movement along the second axis by the first part is possible.

12. A tool according to claim 11 characterised in that the movement of the first part along the second part is in a guided sliding manner along a slotted aperture.

* * * * *